United States Patent

[11] 3,598,931

[72] Inventor Daniel J. Foote
Wauwatosa, Wis.
[21] Appl. No. 846,145
[22] Filed July 30, 1969
[45] Patented Aug. 10, 1971
[73] Assignee Master Lock Company
Milwaukee, Wis.

[54] TELEPHONE SET LOCKS
8 Claims, 10 Drawing Figs.

[52] U.S. Cl. .......... 179/189, 70/14
[51] Int. Cl. .......... H04m 1/66, E05b 13/00
[50] Field of Search .......... 70/14, 57; 179/189

[56] References Cited

UNITED STATES PATENTS 3,136,858 6/1964 Conviser .......... 179/7.1
1,762,746 6/1930 Shann .......... 179/189
2,641,659 6/1953 Benson .......... 179/189
2,683,778 7/1954 Gilmore .......... 179/189
2,864,906 12/1958 Medenbach .......... 179/189
3,069,513 12/1962 Nimer .......... 179/189
3,124,664 3/1964 Beatty .......... 179/189
3,469,041 9/1969 Winston .......... 179/189

*Primary Examiner*—Ian A. Calvert
*Assistant Examiner*—Edward J. McCarthy
*Attorney*—Curtis B. Morsell, Sr.

ABSTRACT: A lock unit secured within a base cavity in a cradle telephone includes a reciprocal angle plate susceptible of being releasably locked in a lowered position wherein its top portion spans the circuit controlling yieldable plungers to hold the same depressed with the receiver, which normally controls said plungers, either seated in its cradle or removed therefrom, whereby unauthorized use of the telephone is prevented. When the unit is unlocked said angle plate, under the projective force of said spring urged plungers, will, when the receiver is removed from the cradle, where it overlies said angle plate, move upwardly with the plungers to activate the telephone circuit and thus allow normal, authorized use of the telephone set.

FIG - 1
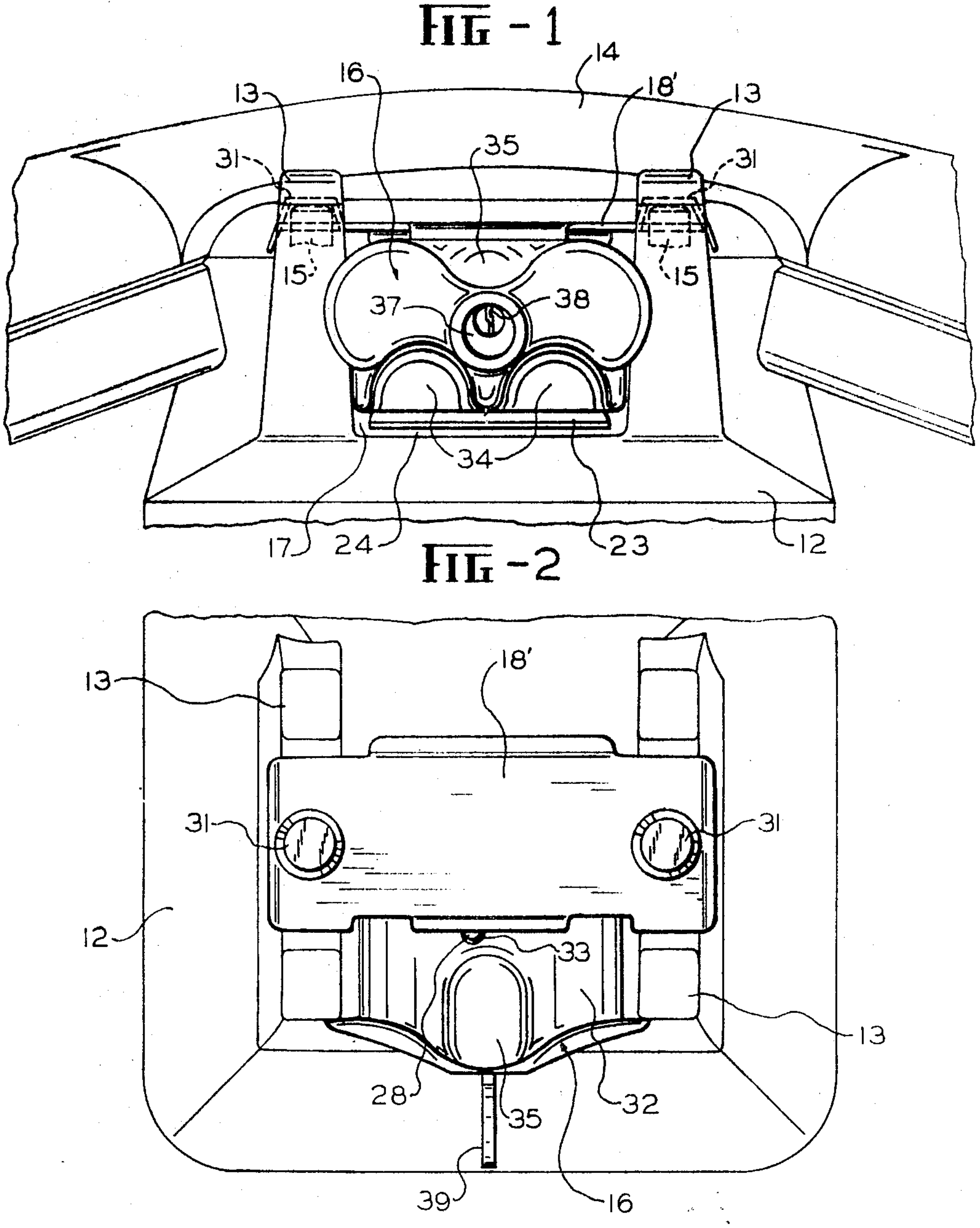
FIG - 1, FIG - 2
FIG - 3
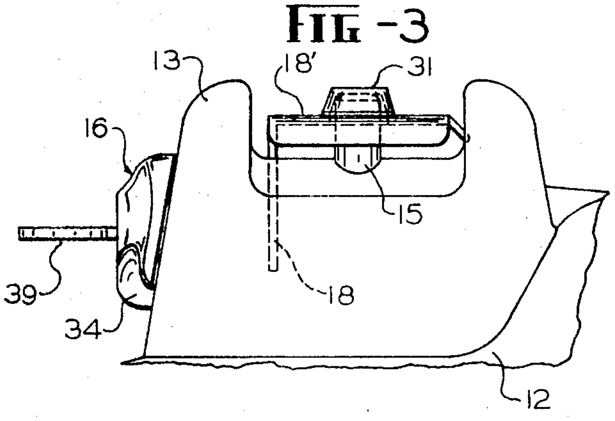
INVENTOR
DANIEL J. FOOTE
BY
Curtis B. Morsell, Jr.
ATTORNEY

INVENTOR
DANIEL J. FOOTE

BY

Curtis B. Morse, Sr.

ATTORNEY

INVENTOR
DANIEL J. FOOTE

BY

Curtis B. Morsell, Sr.

ATTORNEY

TELEPHONE SET LOCKS

BACKGROUND OF THE INVENTION

It has heretofore been proposed to prevent unauthorized use of dial telephone sets by locking a plug or the like in a dial opening to preclude such manipulation of the dial as may be necessary to dial a predetermined number. This arrangement, however, can be thwarted by skillful manual successive punching of the circuit controlling plungers which are released when the receiver is removed. Consequently, the present invention overcomes this, and other means of negativing a telephone lock, by providing a lock unit which may be releasably locked within the rear base portion of a cradle-type telephone in juxtaposition to the cradle mounted plungers which are normally held in their depressed position to render the phone circuit inactive, by the weight of the receiver seated within the cradle. Pursuant to the present invention when the lock unit is in its locked condition an element of the lock unit will hold said plungers in their depressed condition regardless of whether or not the receiver is in place or is removed. Thus, said plungers cannot, when the lock is secured, be punched or manipulated surrepticiously in an effort to punch out the phone number desired. As many of the newer types of cradle telephones eliminate the conventional form of dials, as for instance new pushbutton or "touch-tone" phones, punched card insert phones, and the like, the present telephone set lock is additionally well suited thereto.

SUMMARY OF THE INVENTION

A general objective of the invention is to provide a telephone set lock which, when inserted into the cradle cavity in underlying relation to the seated receiver and with a portion overlying the depressed circuit-controlling plungers, and locked in said position, will remain in said protective position in defiance of surrepticious removal attempts, and will prevent unauthorized use of the telephone set. However, when the lock unit is unlocked, the telephone may be freely used in its normal manner.

A further object of the invention is to provide a telephone set lock which incorporates a simple, key-operated cylinder lock having a plug extension which secures or releases a reciprocal plunger-controlling angle plate.

Further objects of the invention are to provide a telephone set lock which is of relatively simple construction, which may be easily and unobtrusively applied to various types of cradle telephones to prevent unauthorized use thereof, which, as applied to a telephone set, is compact and neat and attractive in appearance, and which is otherwise well adapted for the intended purposes.

BRIEF DESCRIPTION OF THE DRAWINGS

In the accompanying drawings wherein the same reference characters designate the same or similar parts in all of the views:

FIG. 1 is a fragmentary rear view of a desk-type cradle telephone set equipped with the improved lock with the reciprocal angle plate of the latter holding the circuit-controlling yieldable plungers in their depressed condition and with the receiver in its normal, inoperative position within the cradle of the telephone set;

FIG. 2 is a fragmentary plan view of the showing in FIG. 1 with the angle plate locked in its plunger depressing position, the receiver being removed from its cradle;

FIG. 3 is a fragmentary side view of the showing in FIG. 2 only with the lock released and with the angle plate raised to permit upward reciprocation of the circuit-controlling plungers to activate the telephone circuit for dialing and use;

DESCRIPTION OF THE PREFERRED EMBODIMENTS

Figure 4:
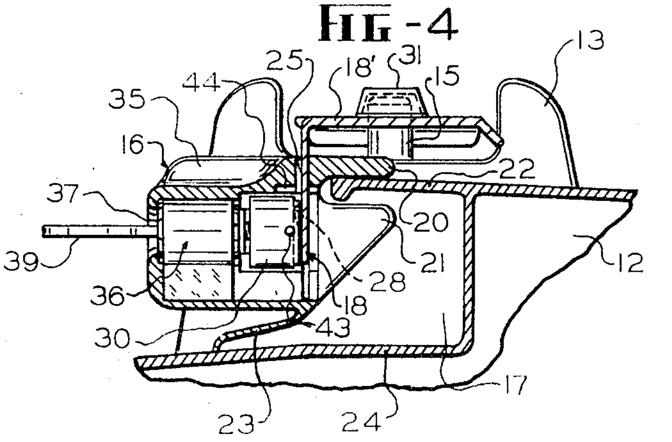
FIG. 4 is a vertical sectional view of the showing in FIG. 3.
Figure 5:
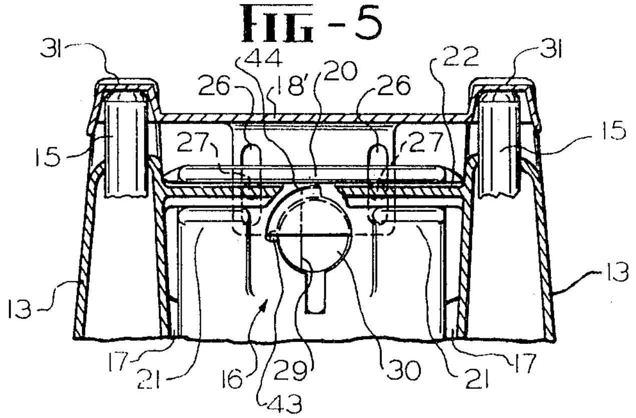
FIG. 5 is a fragmentary, vertical sectional view taken at right angles to the showing in FIG. 4.

While the improved telephone set lock unit is illustrated in connection with a conventional desk or table type, cradle telephone, (dial not shown) it is equally applicable to various other types of telephones such as pushbutton or "touch-tone" phones, punched card insert phones, and the like.

Merely by way of illustration in FIGS. 1—6 inclusive the depicted telephone includes a base 12 housing standard telephone mechanism (not shown), and upstanding from the base 12 at the rear thereof are laterally spaced apart, eared cradle elements 13 which removably hold the receiver 14 when the telephone is not in use. Normally, the cradle lodged receiver 14 holds in depressed condition a pair of standard circuit-controlling spring-urged plungers 15 mounted in the depressed midportion of each cradle element, which, when depressed, as in FIGS. 1 and 6 maintain the telephone circuit or line in a dead or inactive condition. However, when the receiver 14 is removed from its cradle and there is no other restraint on said plungers 15 they will, under the influence of springs, reciprocate upwardly, as in FIGS. 3, 4, and 5 thereby activating the telephone circuit whereby the telephone dial (not shown) may be operated, and the telephone may otherwise be used in its accustomed manner.

The present invention provides a lock unit, generally indicated by the numeral 16, which may be secured within a cavity 17 in the rear of the telephone base between the cradle elements 13. The lock unit 16 includes a vertically reciprocal lockable angle plate 18 having a flat horizontal top 18′ which spans the depressed midportions of the spaced-apart pair of cradles and at its ends it registers with and controls reciprocation of the yieldable plungers 15 which are accommodated by raised hollow bosses 31 at the ends of the plate portion 18′. Thus, when said plate 18 is in its lowered position and so retained by the receiver (the plate portion 18′ being interposed between the receiver and the upper ends of the plungers 15), the plungers will be maintained in their depressed condition causing the telephone circuit to be inactive. As the angle plate 18 may be locked in this position, by means hereinafter to be described, even if the receiver is then removed from its cradle the plungers 15 will remain in their depressed position and the telephone cannot be operated, thus guarding against the surrepticious use by unauthorized persons.

Figure 9:
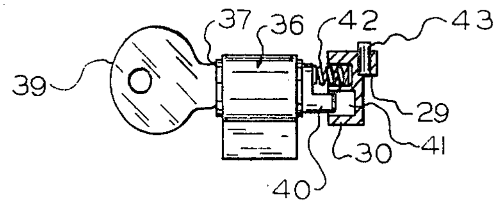
FIG. 9 is a detail side view of the key-operated cylinder lock mechanism included in the lock unit and showing its slide controlling plug extension in section.
Figure 8:
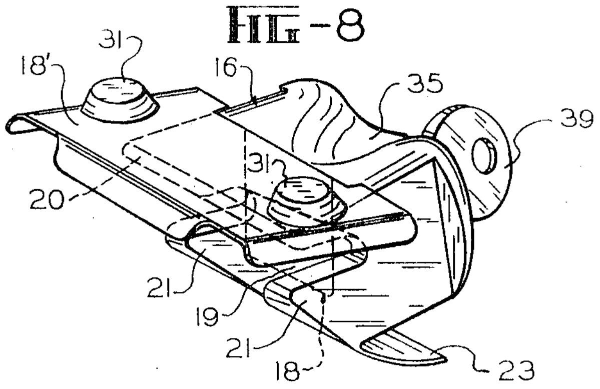
FIG. 8 is a front and side perspective view of the entire lock unit removed from a telephone set.

The body or casing of the lock unit 16 is of eccentric shape, as is best shown in FIGS. 8 and 9. The front of the same is formed with a transverse U-shaped recess 19 formed between a forwardly projecting horizontal top ledge 20 and a pair of laterally spaced-apart lugs 21 thereby adapting the unit 16 to be housed within the telephone base cavity 17 with the top horizontal flange 22 of the base, which extends between the elements 13 of the cradle, being accommodated by said unit recess 19, which prevents vertical displacement of the lock unit 16. Depending angularly rearwardly from the lower front margin of the lock unit 16 is a yieldable skirt 23, which, when the lock unit is installed within the base 12 of the telephone set yieldingly, frictionally engages the lower wall 24 of the base cavity 17 to retard undesired rearward displacement of the unit from the base cavity, as in FIG. 4.

Figure 10:
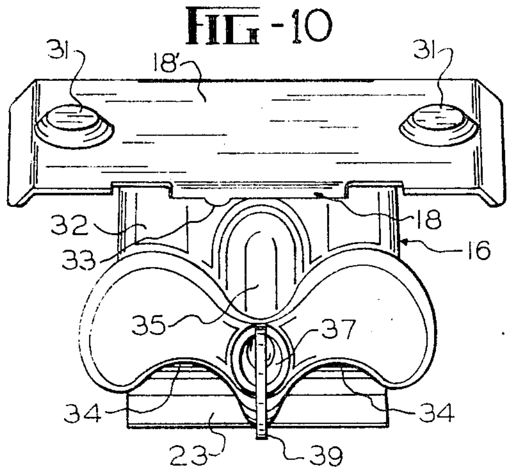
FIG. 10 is a rear view of the removed lock unit in slight top perspective.

The body or casing of the lock unit 16 rearwardly of the lugs 21 and ledge 20 is provided with a vertical transverse slot 25 (see FIG. 4) which vertically reciprocatably receives the vertical portion of the angle plate 18. The latter is formed with spaced-apart vertical slots 26 which receive horizontal guide pins 27 mounted in the body of the unit 16 and extending across the slot 25. Said pins 27 and slots 26 limit the up and down movement of the angle plate 18. Projecting from the rear face of the vertical portion of the angle plate 18 there is a protuberance 28 which cooperates with a shoulder 29 on the adjacent face of a turnable cylinder lock plug extension 30 for angle plate locking purposes, as will hereinafter appear. As is best shown in FIGS. 2 and 10 the eccentric top wall 32 of the lock unit 16 rearwardly of the plate portion 18' is formed with a small cutout 33 to accommodate the protuberance 28 when the angle plate 18' is reciprocated upwardly. The rear of the lock unit 16 is formed with finger grip openings 34 to cooperate with a thumb recess 35 in the top wall 32 to render it convenient in manually handling the lock unit for insertion into or removal from the base cavity 17 in the rear of the telephone set.

A cylinder lock generally indicated by the numeral 36 is shown in detail in FIG. 9 and in its relation to the lock unit and other components in FIG. 4. The lock 36 is completely operatively housed within a suitable cavity therefor in the body of the unit 16 and extends from the rear wall inwardly toward the vertical portion of the reciprocal angle plate 18' into adjacency with the angle plate protuberance 28. The plug 37 of the cylinder lock has a rearwardly accessible key slot 38 to be entered by a suitable key 39 whereby the lock may be operated by turning movement applied to the plug 37. The forward end of the plug is mutilated, as at 40, to operatively engage in a shouldered recess 41 therefor in the disclike plug extension 30 whose exposed face is formed with the shoulder 29 previously mentioned. A confined coiled spring 42 permits yielding axial reciprocation of the plug extension 30. Also, the plug extension carries an outwardly projecting radial pin 43 which rides in an arcuate slot 44 in a forward wall portion of the unit to limit the turning movement of the cylinder lock plug 37 and the key in either direction.

The manner in which the improved telephone set lock is used and operated will now be summarized. To install the unit 16 within the base cavity 17 in the telephone portion 12 the key 39 should be entered into the exposed key slot 38 of the cylinder lock plug 37 and turned in a clockwise direction from an upright position as in FIGS. 8, 9, and 10 to a horizontal position at right angles thereto, as in FIG. 4. The turning movement of the key, the plug 37, and its extension 30 is limited by the pin 43 moving in the slot 44. The turning movement disposes the plug extension shoulder 29 in the position of FIG. 5 so that the reciprocal angle plate 18 is released and when it is manually lifted the protuberance 28 thereon, not being blocked by said shoulder 29, permits the angle plate to be raised in its slot 25 with the protuberance 28 moving into or through the cutout 33. At this point it might be mentioned that, by virtue of the spring 42 and the mounting of the plug extension 30 relative to the plug portion 41, the plug extension is axially yieldable but the spring 42 maintains the shoulder 29 in adjacency with the vertical portion of the angle plate 18. Also, during movement of the angle plate the pins 27 ride in the angle plate slots 26.

With the lock unit 16 in the above described condition it can be inserted into the telephone base cavity 17 and as previously mentioned the openings 34 and recess 35 in the body of the lock unit afford convenient means for handling it. In slipping the lock unit into the cavity 17 the unlocked angle plate 18 can move upwardly so that its top plate 18' will ride over the adjacent cradle ears 13 and then drop into the depressed midportions of the cradle elements, as in FIGS. 1 and 2, this being accomplished while the receiver 14 is removed from the cradle, but when the lock unit is installed the receiver may be replaced in the cradle, overlying the top portion 18' of the angle plate and the plungers 15 will be held depressed, maintaining the telephone circuit inactive. However, as has been heretofore mentioned, the telephone may be used in its normal manner and when the receiver is removed the force of the plungers 15 acting against the unlocked angle plate 18 will lift the same as in FIGS. 4 and 5, and the telephone circuit will be activated.

Figure 6:
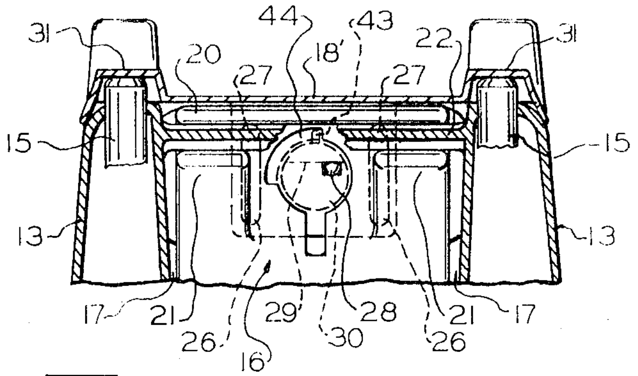
FIG. 6 is a fragmentary, vertical sectional view similar to FIG. 5 only showing the angle plate in its lowered position wherein the plungers are held in their depressed circuit deactivating position.
Figure 7:
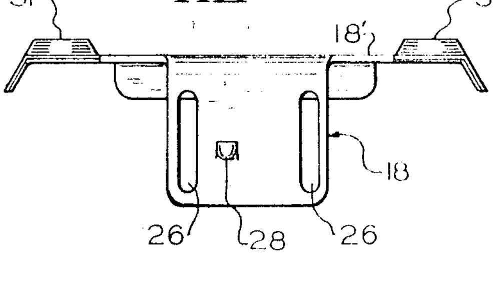
FIG. 7 is a front view of the reciprocal angle plate member of the lock unit.

To render the telephone set unavailable for use by an unauthorized person or tamperer it is merely necessary to turn the key to its upright position whereupon the parts will assume the position shown in FIG. 6 with the plug extension shoulder 29 engaging the protuberance 28 to prevent upward movement of the angle plate 18. The key in this position may be removed from its plug slot 38 by the authorized user of the telephone set and the set will not then be susceptible of being activated by dialing or plunger manipulation. With the unit 16 locked in its position above described it cannot be unauthorizedly dislodged from the telephone set because the depressed angle plate 18' is confined between the ears of the cradle elements in the depressed midportions of the cradle elements, and there are other wall and flange overhangs and abutments, previously mentioned.

From the foregoing description it will appear that the improved telephone set lock may be easily mounted in a cradle type of telephone set and may be locked therein so as to prevent its unauthorized removal and so as to prevent unauthorized use of the telephone. It is simple to operate, is compact and unobtrusive, and is well adapted for the intended purposes.

I claim:

1. In a telephone set lock assemblage for use with a cradle telephone of the removable receiver type including circuit controlling depressible plungers mounted in portions of the cradle normally depressed to circuit deactivating position by the cradle-seated receiver, the telephone including a base with a rearwardly opening cavity therein below the cradle with a horizontal flange extending across the top of the cavity, the improvement comprising: a lock unit body lockably and operatively installed within said base cavity, said lock unit body having a forwardly opening recess in its upper front portion which receives said telephone base horizontal flange to prevent vertical displacement of the installed lock unit body; an angle plate having a vertical portion and an integral horizontal portion at the upper end of said vertical portion with the latter being mounted on said lock unit body to reciprocate in spanning relation to the cradle and contactably overlying said plungers; and means between said lock mechanism and said angle plate to reciprocate the latter downwardly when said lock mechanism is moved to one position to confine the horizontal portion of said angle plate within the cradle to further secure the lock unit body in its installed operative condition within the telephone base cavity but vertically yieldably releasing said angle plate when the lock mechanism is in its second position while the lock unit body is in its installed condition permitting said plungers to move to their circuit activating position when the receiver is removed.

2. The telephone set lock assemblage recited in claim 1 wherein cooperating means are formed on the lock unit body and the angle plate to limit the movement of the latter relative to the former.

3. The telephone set lock assemblage recited in claim 1 wherein the lock unit body and the angle plate are formed with cooperating pin and slot means to limit the reciprocatory movement of the angle plate.

4. The telephone set lock assemblage recited in claim 1 wherein the lock mechanism housed within the lock unit body is a key-operated cylinder lock including a turnable plug and a plug extension connected to and turned by the plug, the plug extension also being connected to the angle plate to reciprocate it.

5. The telephone set lock assemblage recited in claim 4 wherein the plug extension is axially yieldable.

6. The telephone set lock assemblage recited in claim 4 wherein the plug extension and the lock unit body are formed with cooperating means to limit the turning movement of the cylinder lock plug in either direction.

7. The telephone set lock assemblage recited in claim 1 wherein the rear of the lock unit body is formed with finger grip openings.

8. The telephone set lock assemblage recited in claim 1 wherein the lock mechanism is operable in its installed condition to hold said angle plate in its lowered, plunger depressing position or to release the plate from the latter position.